Patented Oct. 21, 1952

2,615,023

UNITED STATES PATENT OFFICE 2,615,023

N-SUBSTITUTED FORMAMIDINES

John G. Erickson, Greenwich, Conn., assignor to American Cyanamid Company, New York, N. Y., a corporation of Maine No Drawing. Application January 13, 1950, Serial No. 138,521

10 Claims. (Cl. 260—293)

The present invention relates to a novel method of preparing N-substituted formamidines.

It is an object of the invention to prepare such formamidines by reacting specific classes of amines with hydrogen cyanide according to the following equation

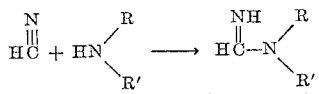

in which the amine is a member of the group consisting of primary alkyl amines, dialkyl amines, bis(hydroxyalkyl) amines and piperidine.

While the reaction is apparently a simple one, this is actually not the fact, and there are several critical features to be observed. The hydrogen cyanide must be added, either as a liquid or a gas but preferably the former, to the amine, and the amine must always be in stoichiometric excess; otherwise the desired product is not obtained. Furthermore, only certain amines, described in the equation above, will react with hydrogen cyanide even under these conditions to give the desired formamidine. Aromatic amines, such as aniline and methyl aniline will not react to give the formamidine nor will monoethanol amine. Furthermore, the reaction takes place only within relatively narrow temperature limits. The reaction can be carried out at a temperature as low as about —10° to —15° C. or as high as about 75° C. At temperatures substantially beyond these limits, the desired products are not obtained. At least several hours are required for the reaction, and preferably several days. After adding the hydrogen cyanide to the amine, the mixture is stirred and then allowed to stand. After the reaction to form the formamidine is completed, the excess amine is distilled off to give the crude formamidine.

The N-substituted formamidines prepared according to this process are in some instances impure and as a rule, owing to their instability, are not readily purified by any known practicable procedure. The yield, however, may be readily calculated by hydrolyzing the crude material to give the corresponding formamide. Such hydrolysis may be conducted simply by letting the crude formamidine stand at room temperature with an excess of water.

The following examples illustrate without limiting the invention.

EXAMPLE 1

*N-n-butylformamidine*

A mixture of 13.5 parts of hydrocyanic acid and 73 parts of n-butylamine was allowed to stand for three weeks at room temperature. That N-n-butylformamidine had been formed in good yield is indicated by the fact that hydrolysis of the reaction mixture gave ammonia and a 71% yield of N-n-butylformamide.

EXAMPLE 2

*N,N-diethylformamidine*

The addition of 40.5 parts of hydrocyanic acid to 146 parts of diethylamine gave a product which was completely solid at room temperature. After standing for eleven days at room temperature, the mixture had become dark and completely liquid. It contained N,N-diethylformamidine since hydrolysis at room temperature gave ammonia and N,N-diethylformamide.

EXAMPLE 3

*N,N-di-n-butylformamidine*

A mixture of 147 parts of di-n-butylamine and 27 parts of hydrocyanic acid was allowed to stand at room temperature for two weeks. Unreacted starting materials were then distilled off under a pressure of 1 mm. of mercury to yield N,N-di-n-butylformamidine as a dark-colored liquid.

EXAMPLE 4

*N,N-bis(2-hydroxyethyl)formamidine*

A mixture of 125 parts of diethanolamine and 27 parts of hydrocyanic acid was allowed to stand at room temperature for two days. At the end of this time the originally liquid mixture was nearly completely solid. Vacuum filtration removed a thick black tar, leaving a dark brown solid. The solid was washed with three portions of isopropyl alcohol, then crystallized from methanol to give 9.8 parts of N,N-bis(2-hydroxyethyl)formamidine, tan crystals melting with decomposition at 105°–106° C.

EXAMPLE 5

*1-formimidylpiperidine*

A mixture of 6.8 parts of hydrocyanic acid and 43 parts of piperidine was allowed to stand at room temperature for several days. The mixture, which was originally mostly solid, gradually darkened and became completely liquid. A formamidine was formed in very good yield in this reaction since hydrolysis of the reaction mixture gave a 90% yield of the corresponding formamide, 1-formylpiperidine.

While the invention has been described with particular reference to specific embodiments, it is to be understood that it is not to be limited thereto but is to be construed broadly and restricted solely by the scope of the appended claims.

I claim:

1. The method which consists of adding hydrogen cyanide to a stoichiometric excess of an N-hydrogen containing amine of the group consisting of primary alkyl amines, dialkyl amines, bis(hydroxyalkyl) amines, and piperidine at a temperature of at least about −15° C. but not higher than about 75° C., allowing the mixture to stand to produce an N-substituted formamidine and recovering a product comprising the thus-formed N-substituted formamidine.

2. The method according to claim 1 in which the reaction is conducted at approximately room temperature.

3. The method of preparing N-n-butylformamidine which consists of adding hydrogen cyanide to a stoichiometric excess of n-butylamine, allowing the mixture to stand at a temperature of at least about −15° C. but not higher than about 75° C. to produce N-n-butylformamidine, and recovering a product comprising the thus-formed N-n-butylformamidine.

4. The method of preparing N,N-diethylformamidine which consists of adding hydrogen cyanide to a stoichiometric excess of diethylamine, allowing the mixture to stand at a temperature of at least about −15° C. but not higher than about 75° C. to produce N,N-diethylformamidine, and recovering a product comprising the thus-formed N,N-diethylformamidine.

5. The method of preparing N,N-di-n-butylformamidine which consists of adding hydrogen cyanide to a stoichiometric excess of di-n-butylamine, allowing the mixture to stand at a temperature of at least about −15° C. but not higher than about 75° C. to produce N,N-di-n-butylformamidine, and recovering a product comprising the thus-formed N,N-di-n-butylformamidine.

6. The method of preparing N,N-bis(2-hydroxyethyl)formamidine which consists of adding hydrogen cyanide to a stoichiometric excess of diethanolamine, allowing the mixture to stand at a temperature of at least about −15° C. but not higher than about 75° C. to produce N,N-bis-(2-hydroxyethyl)formamidine, and recovering a product comprising the thus-formed N,N-bis(2-hydroxyethyl)formamidine.

7. The method of preparing 1-formimidylpiperidine which consists of adding hydrogen cyanide to a stoichiometric excess of piperidine, allowing the mixture to stand at a temperature of at least about −15° C. but not higher than about 75° C. to produce 1-formimidylpiperidine, and recovering a product comprising the thus-formed 1-formimidylpiperidine.

8. The method according to claim 1 in which the amine is a primary alkyl amine.

9. The method according to claim 1 in which the amine is a dialkyl amine.

10. The method according to claim 1 in which the amine is a bis(hydroxyalkyl) amine.

JOHN G. ERICKSON.

REFERENCES CITED

The following references are of record in the file of this patent:

UNITED STATES PATENTS

| Number | Name | Date |
|---|---|---|
| 1,994,732 | Sebrell | Mar. 19, 1935 |
| 2,049,582 | Ziegler | Aug. 4, 1936 |
| 2,455,807 | Redmon et al. | Dec. 7, 1948 |

FOREIGN PATENTS

| Number | Country | Date |
|---|---|---|
| 246,669 | Switzerland | Dec. 1, 1947 |
| 106,624 | Sweden | Feb. 23, 1943 |

OTHER REFERENCES

Degering, "Outline of Org. Nitrogen Compounds" (Min. Lithoprinters) p. 528 (1945).